(12) United States Patent
Chen et al.

(10) Patent No.: US 12,499,368 B2
(45) Date of Patent: Dec. 16, 2025

(54) DEEP NEURAL NETWORK OPERATION METHOD AND APPARATUS

(71) Applicant: Hangzhou Hikvision Digital Technology Co., Ltd., Hangzhou (CN)

(72) Inventors: Weijie Chen, Hangzhou (CN); Yuan Zhang, Hangzhou (CN); Di Xie, Hangzhou (CN); Shiliang Pu, Hangzhou (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 1268 days.

(21) Appl. No.: 17/289,626

(22) PCT Filed: Nov. 5, 2019

(86) PCT No.: PCT/CN2019/115656
§ 371 (c)(1),
(2) Date: Apr. 28, 2021

(87) PCT Pub. No.: WO2020/093996
PCT Pub. Date: May 14, 2020

(65) Prior Publication Data
US 2021/0397953 A1    Dec. 23, 2021

(30) Foreign Application Priority Data
Nov. 5, 2018    (CN) .......................... 201811307229.4

(51) Int. Cl.
*G06N 3/084*    (2023.01)
*G06F 7/483*    (2006.01)
(Continued)

(52) U.S. Cl.
CPC .............. *G06N 3/084* (2013.01); *G06F 7/483* (2013.01); *G06F 7/49947* (2013.01); *G06F 17/17* (2013.01); *G06N 3/08* (2013.01)

(58) Field of Classification Search
CPC .......... G06N 3/082; G06N 3/04; G06N 3/084; G06N 3/08; G06F 18/2136;
(Continued)

(56) References Cited

FOREIGN PATENT DOCUMENTS

| CN | 105160310 | 12/2015 |
|----|-----------|---------|
| CN | 106407931 | 2/2017  |

(Continued)

OTHER PUBLICATIONS

Extended European Search Report issued in Corresponding European Application No. 19881764.5, dated Dec. 3, 2021.
(Continued)

*Primary Examiner* — Ann J Lo
(74) *Attorney, Agent, or Firm* — NORTON ROSE FULBRIGHT US LLP (57) ABSTRACT

A deep neural network operation method and apparatus are provided. The method comprises: obtaining an input feature map of a network layer; displacing respectively, according to a preset displacement parameter, each of channels of the input feature map of the network layer along axes, to obtain a displaced feature map, wherein the preset displacement parameter comprises displacement amounts of the channel in the axes; and performing convolution operation on the displaced feature map with a 1×1 convolution kernel to obtain an output feature map of the network layer. The operation efficiency of the DNN can be improved through the above method.

10 Claims, 4 Drawing Sheets

(51) Int. Cl.
    *G06F 7/499*     (2006.01)
    *G06F 17/17*     (2006.01)
    *G06N 3/08*     (2023.01)

(58) Field of Classification Search
    CPC ............... G06F 18/24143; G06F 7/483; G06F 7/49947; G06F 17/17
    See application file for complete search history.

(56) References Cited

FOREIGN PATENT DOCUMENTS

| | | | | |
|---|---|---|---|---|
| CN | 106548192 | | 3/2017 | |
| CN | 106909887 | | 6/2017 | |
| CN | 107238507 | | 10/2017 | |
| CN | 201710570245 A | * | 10/2017 | ............. G06N 3/084 |
| CN | 108596206 A | * | 9/2018 | ............ G06K 9/6268 |
| CN | 201810259132 A | * | 10/2018 | ............. G06N 3/045 |
| NL | 2017050084 W | * | 2/2017 | ............. G06N 3/045 |
| WO | WO 2018/067962 | | 4/2018 | |

OTHER PUBLICATIONS

Jeon et al., "Constructing Fast Network through Deconstruction of Convolution" Cornell University Library, Oct. 2018, https:/arxiv.org/, XP081197389.

Wu et al., "Shift: A Zero FLOP, Zero Parameter Alternative to Spatial Convolutions" 2018 IEEE/CVF Conference on Computer Vision and Pattern Recognition, Jun. 18, 2018, XP033473838, DOI:10.1109/CVPR.2018.00951, pp. 9127-9135.

International Search Report and Written Opinion issued in Corresponding PCT Application No. PCT/CN2019/115656, dated Jan. 23, 2020 (English Translation provided).

* cited by examiner

DEEP NEURAL NETWORK OPERATION METHOD AND APPARATUS

CROSS REFERENCE TO RELATED APPLICATIONS

The present application is a national phase application under 35 U.S.C. § 371 of International Application No. PCT/CN2019/115656, filed Nov. 5, 2019, which claims the benefit of priority to Chinese patent application No. 201811307229.4, filed with the China National Intellectual Property Administration on Nov. 5, 2018 and entitled "Deep Neural Network Operation Method and Apparatus", each of which are incorporated herein by reference in their entirety.

TECHNICAL FIELD

The present application relates to the field of machine learning technology, and in particular to a deep neural network operation method and apparatus.

BACKGROUND

As an emerging field in machine learning research, Deep Neural Network (DNN) analyzes data by imitating the mechanism of human brain, and is an intelligent model for analysis and learning by establishing and simulating the human brain. At present, DNNs such as Convolutional Neural Network (CNN), Recurrent Neural Network (RNN) and Long Short Term Memory (LSTM) have been well applied in target detection and segmentation, behavior detection and recognition, speech recognition or the like. With the increasing amount of data, the calculation complexity of the DNN is increasing.

At present, in order to reduce the calculation complexity of DNN, lightweight neural network structures are generally used, such as mobile-end convolutional neural networks MobileNet and ShuffleNet or the like. These lightweight neural network structures implement convolution operation through Depthwise Convolution (DWConv). Specifically, each of channels of the input feature map is convoluted separately, and then the convolution result of each of channels is convoluted by using 1×1 convolution kernel to realize information aggregation on the channel dimension. DWConv splits complex convolution operation, convolves the feature map of a channel, and then uses 1×1 convolution kernel to realize information aggregation on the channel dimension, thus reducing the complexity of each convolution operation.

However, as mentioned above, multiple convolution operations are required in DWConv. This reduces DNN operation efficiency.

SUMMARY

Embodiments of the present application provide a deep neural network operation method and apparatus. Operation efficiency of DNN can be improved. The following aspects are provided.

In a first aspect, an embodiment of the present application provides a deep neural network operation method, which includes:
obtaining an input feature map of a network layer;
displacing respectively, according to a preset displacement parameter, each of channels of the input feature map of the network layer along axes, to obtain a displaced feature map, wherein the preset displacement parameter comprises displacement amounts of the channel in the axes; and
performing convolution operation on the displaced feature map with a 1×1 convolution kernel to obtain an output feature map of the network layer.

Optionally, a displacement amount is an average distribution of multiple preset different offsets.

Optionally, the preset displacement parameter is obtained by learning in advance;
the process of obtaining the preset displacement parameter by learning comprises:
obtaining an initial displacement parameter;
converting the displacement amounts in the initial displacement parameter into floating-point displacement amounts;
obtaining an output function of the network layer through a bilinear interpolation algorithm according to the input feature map of the network layer and the floating-point displacement amounts;
determining a network loss value of the depth neural network according to input data of the depth neural network, the 1×1 convolution kernel, the initial displacement parameter and a label corresponding to the input data; and
calculating, according to the output function of the network layer, a gradient of the network loss value with respect to the displacement parameter, and updating the displacement parameter in multiple iterations by a gradient descent method to obtain the preset displacement parameter.

Optionally, determining a network loss value of the depth neural network according to input data of the depth neural network, the 1×1 convolution kernel, the initial displacement parameter and a label corresponding to the input data comprises:
calculating a network loss function of the deep neural network according to the input data of the deep neural network, the 1×1 convolution kernel, the initial displacement parameter, and the label corresponding to the input data;
calculating a first regularization term according to the 1×1 convolution kernel;
calculating a second regularization term according to the displacement parameter; and
weighting the network loss function, the first regularization term, and the second regularization term to obtain the network loss value of the deep neural network.

Optionally, displacing respectively, according to a preset displacement parameter, each of channels of the input feature map of the network layer along axes, to obtain a displaced feature map comprises:
rounding off the floating-point displacement amounts in the preset displacement parameter to obtain integer displacement amounts; and
displacing respectively, according to the integer displacement amounts in the preset displacement parameter, each of channels of the input feature map along the axes, to obtain the displaced feature map.

In a second aspect, an embodiment of the present application provides a deep neural network operation apparatus, including
an obtaining module, configured for obtaining an input feature map of a network layer;
a displacement module, configured for displacing respectively, according to a preset displacement parameter, each of channels of the input feature map of the network layer along axes, to obtain a displaced feature map, wherein the preset displacement parameter comprises displacement amounts of the channel in the axes; and an operation module, configured for performing convolution operation on the displaced feature map with a 1×1 convolution kernel to obtain an output feature map of the network layer.

Optionally, a displacement amount is an average distribution of multiple preset different offsets.

Optionally, the preset displacement parameter is obtained by learning in advance;

the apparatus further comprises: a learning module configured for:

obtaining an initial displacement parameter;

converting the displacement amounts in the initial displacement parameter into floating-point displacement amounts;

obtaining an output function of the network layer through a bilinear interpolation algorithm according to the input feature map of the network layer and the floating-point displacement amounts;

determining a network loss value of the depth neural network according to input data of the depth neural network, the 1×1 convolution kernel, the displacement parameter and a label corresponding to the input data; and calculating, according to the output function of the network layer, a gradient of the network loss value with respect to the displacement parameter, and updating the displacement parameter in multiple iterations by a gradient descent method to obtain the preset displacement parameter.

Optionally, the learning module is specifically configured for:

calculating a network loss function of the deep neural network according to the input data of the deep neural network, the 1×1 convolution kernel, the initial displacement parameter, and the label corresponding to the input data;

calculating a first regularization term according to the 1×1 convolution kernel;

calculating a second regularization term according to the displacement parameters; and weighting the network loss function, the first regularization term, and the second regularization term to obtain the network loss value of the deep neural network.

Optionally, the displacement module is further configured for:

rounding off the floating-point displacement amounts in the preset displacement parameter to obtain an integer displacement amounts; and displacing respectively, according to the integer displacement amounts in the preset displacement parameter, each of channels of the input feature map along the axes, to obtain the displaced feature map.

In a third aspect, an embodiment of the present application provides an electronic device, including a processor and a machine-readable storage medium having machine executable instructions stored thereon which, when executed by the processor, cause the processor to perform the method provided in the first aspect of the embodiments of the present application.

In a fourth aspect, an embodiment of the present application provides a machine-readable storage medium, having machine-executable instructions stored thereon which, when called and executed by a processor, cause the processor to perform the method provided in the first aspect of the present application.

In a fifth aspect, an embodiment of the present application provides an application program which, when being executed, performs the method provided in the first aspect of the embodiments of the present application.

In embodiments of the present application, a solution is provided as follows. An input feature map of a network layer is obtained. Each of channels of the input feature map of the network layer is displaced respectively, along each of axes, according to a preset displacement parameter. In this way, a displacement feature map is obtained. Convolution operation is performed on the displacement feature map with a 1×1 convolution kernel to obtain an output feature map of the network layer. Each of channels of the input feature map of the network layer is displaced along axes respectively. A misplacement of the input feature map of the network layer is used, to communicate information in the receptive field. As such, the subsequent 1×1 convolution kernel may not only aggregate information on a channel dimension, but also aggregate information on a spatial domain dimension. The whole process requires only a single 1×1 convolution. This effectively improves the operation efficiency of the DNN.

BRIEF DESCRIPTION OF THE DRAWINGS

In order to more clearly describe the technical solution of the embodiments of the present application and the prior art, drawings needed in the embodiments and the prior art will be briefly described below. Obviously, the drawings described below are for only some embodiments of the present application, one of ordinary skills in the art can also obtain other drawings based on these drawings without any creative efforts.

DETAILED DESCRIPTION

In order to make the objectives, technical solutions and advantages of the application more clearly, the present application will be further described in detail with reference to the accompanying drawings and examples. Obviously, the embodiments described are only some of the embodiments of the present application, not all of them. All other embodiments obtained by those of ordinary skills in the art based on the embodiments herein without any creative efforts are within the scope of the present application.

The embodiments of the present application provide a deep neural network operation method, apparatus, electronic device and machine-readable storage medium, so as to improve the operation efficiency of the DNN.

The depth neural network operation method according to the embodiments of the present application will be first introduced below.

The deep neural network operation method according to embodiments of the present application may be performed on an electronic device that can implements intelligent algorithms. The electronic device may be an intelligent device capable of target detection and segmentation, behavior detection and recognition or speech recognition, such as a remote computer, a remote server, an intelligent camera, or an intelligent voice device. The device includes at least a processor equipped with a core processing chip. The deep neural network operation method according to embodiments of the present application may be embodied in software, hardware, and logic circuits disposed in the entity.

Figure 1:
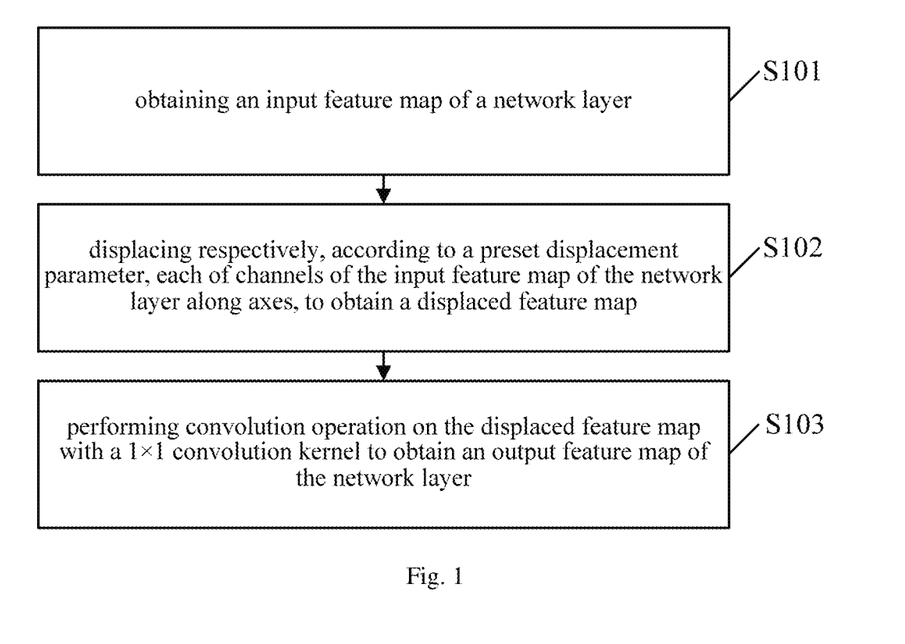
FIG. 1 is a schematic flowchart of a depth neural network operation method according to an embodiment of the present application.

As shown in FIG. 1, the depth neural network operation method according to an embodiment of the present application may include the following steps.

S101, obtaining an input feature map of a network layer.

The network layer may be any operation layer in a depth neural network. In this embodiment, the network layer includes a displacement layer and a 1×1 convolution kernel, wherein one displacement layer corresponds to one displacement structure, that is, the displacement layer may be a displacement structure that can display an input feature map of the network layer. Of course, the displacement layer may also be a structure obtained by combining basic structures, such as a convolution layer and a pooling layer, with the displacement structure.

S102, displacing respectively, according to a preset displacement parameter, each of channels of the input feature map of the network layer along axes, to obtain a displaced feature map.

Figure 2:
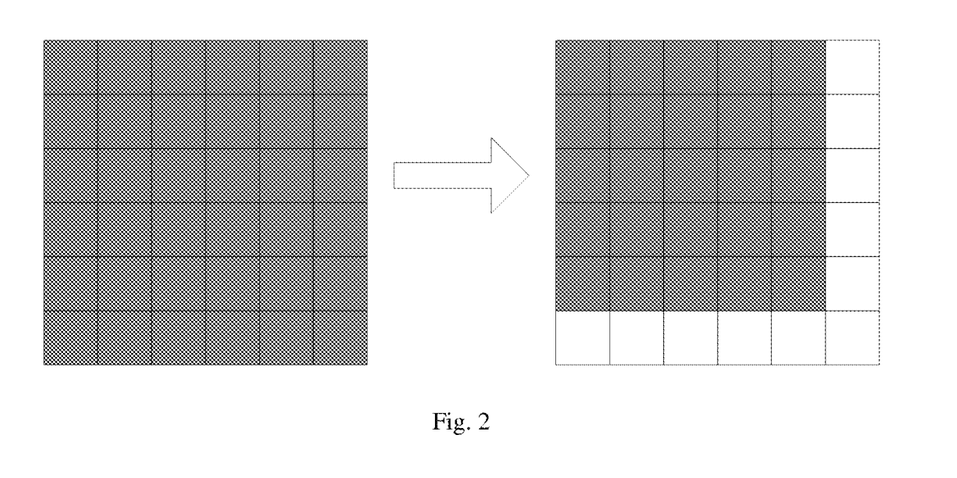
FIG. 2 is a schematic diagram of channel displacement according to an embodiment of the present application.

The preset displacement parameter includes displacement amounts of a channel in axes. If the input feature map of the network layer has C channels, the displacement layer that displaces the input feature map may be a structure with 2C parameters. A displacement parameter (DX (c), Dy (c)) includes displacement amounts of a C-th channel in x and y axes. For example, as shown in FIG. 2, a displacement parameter of (1, 1) for a single channel moves the feature map of the channel towards upleft by one unit. The part that exceeds the boundary is discarded, and the new vacant position is filled with zero. This displacement operation may be expressed as formula (1):

$$O_{C,x,y}=I_{C,x+dx(C),y+dy(C)} \quad (1)$$

wherein, $I_C$ is the C-th channel of the input feature map of the network layer, $O_C$ is the C-th channel of the displaced feature map, (x,y) is a coordinate point on the displacement feature map, (DX(c), Dy(c)) is the displacement parameter for the C-th channel, and (x+DX(c), y+Dy(c)) and (x,y) corresponds to coordinate points before the input feature map of the network layer is displaced.

Each channel has a respective preset displacement parameter, and is displaced according to the displacement parameter, to obtain a displaced feature map. The preset displacement parameter may be constant, for example, a calculated average attribution of multiple preset different offsets, and the preset displacement parameter may also be obtained through learning.

Optionally, a displacement amount is an average distribution of multiple preset different offsets.

The displacement amount in the preset displacement parameters may be obtained by calculating an average distribution of multiple preset different offsets. The multiple preset different offsets may be set empirically. A greater number of offsets can ensure higher accuracy of the preset displacement parameters obtained by calculating average distribution. Of course, in addition to calculation of the average distribution, the preset displacement parameter can be obtained through Gaussian distribution.

Optionally, the preset displacement parameters can also be obtained through learning.

The preset displacement parameters may be obtained by learning through the following steps.

In a first step, an initial displacement parameter is obtained.

The initial displacement parameter may be in various forms. For example, the initial displacement parameter can be (0, 0) Displacement amounts in the initial displacement parameter may also be the averages of multiple different offsets. The initial displacement parameter may also be emprically set by the user.

In a second step, displacement amounts in the displacement parameter are converted into floating-point displacement amounts.

The initial displacement parameter typically includes discrete integer variables. To allow the displacement parameter to be obtained by learning, in this embodiment, displacement amounts in the displacement parameter are converted to the floating-point displacement amounts.

In a third step, an output function of the network layer is obtained by means of bilinear interpolation algorithm according to the input feature map of the network layer and floating-point displacement amounts.

In order to obtain the displacement parameter by learning, in addition to converting the displacement amounts in the displacement parameter to floating-point displacement amounts, the displacement operation in this embodiment is also converted to differential bilinear interpolation sampling, so that the formula (1) may be transformed into:

$$O_{C,x,y}=\Sigma_{(n,m)\in\Omega}I_{C,n,m}(1-|x+dx(C)-n|)(1-|y+dy(C)-m|) \quad (2)$$

wherein, $I_C$ is the C-th channel of the input feature map of the network layer, $O_C$ is the C-th channel of the displaced feature map, (x,y) is a coordinate point on the displacement feature map, $\Omega$ is the neighborhood where the floating-point coordinates (x+dx(C),y+dy(C)) in the input feature map of the network layer are located, (n,m) is the coordinates of four boundary points of the neighborhood, (dx(C),dy(C)) is the displacement parameter corresponding to the C-th channel. Formula (2) gives the principle of bilinear interpolation, that is, using four real coordinate points around the target point in the original image to jointly determine a coordinate point in a target image.

In a fourth step, a network loss value of the deep neural network is determined according to input data of the deep neural network, the 1×1 convolution kernel, the initial displacement parameter, and a label corresponding to the input data.

The whole depth neural network may be regarded as a non-linear mapping function, which is a stack of displacement layers, convolution layers, activation layers, pooling layers and/or some other customized network layers, and is used to learn the non-linear mapping between input data of the deep neural network and corresponding labels.

Network loss values are task-related. Different tasks have different loss functions. A classification task have a loss function of softmax, for example. The network loss value represents approximation between an output value or output image of the whole depth neural network and labels (such as category, segmentation result, detection result, etc.) of the input data. Image detection and segmentation may have respective loss functions, examples of which are not provided here.

Optionally, the operation of determining the network loss value of the depth neural network according to input data of the depth neural network, the 1×1 convolution kernel, the displacement parameter and a label corresponding to the input data includes:

calculating the network loss function of the deep neural network according to the input data of the deep neural network, the 1×1 convolution kernel, the initial displacement parameter, and the label for the input data;

calculating a first regularization term according to the 1×1 convolution kernel;

calculating a second regularization term according to the displacement parameter; and weighting the network loss function, the first regularization term, and the second regularization term to obtain the network loss value of the deep neural network.

In order to keep input feature maps in place to the maximum extent, i.e. (dx,dy)=(0,0), and further reduce the loss caused by displacement, the displacement parameter in this embodiment is subject to regularized constraint. The network loss value is shown in formula (3).

$$\text{Loss}=L(f(\text{input}|w_0, \ldots, w_p, dx_0, dy_0, \ldots, dx_q, dy_q) \cdot T) + \lambda_1 \Sigma_i^p R(w_i) + \lambda_2 \Sigma_i^q R(dx_i, dy_i) \quad (3)$$

wherein, Loss is the network loss value of the deep neural network, L(.) is the network loss function, f(.) is the non-linear mapping function represented by the deep neural network, w is the 1×1 convolution layer weight parameter, input is the input data of the deep neural network, (dx,dy) is the displacement parameter, p is the number of convolutional layers, q is the number of displacement layers, T is the label corresponding to the input data of the deep neural network, and λ1, λ2 are weighting coefficients, $\Sigma_i^p R(w_i)$ is the first regularation term, $\Sigma_i^m R(dx_i, dy_i)$ is the second regularation term. The regularation term in this embodiment can be L1 regularation or L2 regularation.

In a fifth step, a gradient of the network loss value with respect to the displacement parameter is calculated according to the output function of the network layer, and the displacement parameter are updated in multiple iterations by a gradient descent method to obtain preset displacement parameter.

The network loss value may be the above network loss value with or without regularized constraint. In particular, the gradient of the network loss value with respect to the output function of the network layer may be calculated according to the chain rule and in a sequence from the last network layer forward. The gradient reflects the adjustment direction and size of the displacement parameter. As such, the preset displacement parameter can be obtained by updating displacement parameter in multiple iterations through a gradient descent method. Specifically, calculation of the gradient of the network loss value with respect to the output function is a process of inverse partial differentiation of the network loss value to the output function, as shown in formula (4):

$$\frac{\partial \text{Loss}}{\partial dx(c)} = \quad (4)$$

$$\sum_x^{width} \sum_y^{height} \frac{\partial \text{Loss}}{\partial O_{c,x,y}} \sum_{(n,m)\in\Omega} I_{o,n,m}(1 - |y + dy(c) - m|)$$

$$\text{sign }(n - x - dx(c)) + \lambda_2 \frac{\partial R(dx(c))}{dx(c)}$$

$$\frac{\partial \text{Loss}}{\partial dy(c)} = \sum_x^{width} \sum_y^{height} \frac{\partial \text{Loss}}{\partial O_{c,x,y}} \sum_{(n,m)\in\Omega} I_{o,n,m}(1 - |x + dx(c) - n|)$$

$$\text{sign }(m - y - dy(c)) + \lambda_2 \frac{\partial R(dy(c))}{dy(c)}$$

wherein, sign (.) is a sign function, which outputs 1 when the input data is positive and outputs −1 when the input data is negative; height and width are the height and width of the displacement feature map. Formula (4) calculates the gradient of the network loss value to the displacement parameter according to the gradient of the network loss value to the displacement feature map, to update the displacement parameters.

Since the displacement layer is expected to be used for displacement operation instead of bilinear interpolation operation during the test phase, and the displacement parameter need to be maintained as the integer parameter during the forward derivation, the forward displacement parameter is always the rounded value of the floating-point parameter. The integer parameter would not cover floating-point parameter, and is only used for forward derivation to obtain a loss value during training process. When calculating gradient by inverse derivation, the updated parameter is a floating-point displacement parameter. If the displacement change of the inverse partial derivative is too small, the forward derivation of the network is not to be affected. Only when the updated displacement change accumulated in multiple iterations causes a substantial change, the forward derivation of the network will be affected. When the training of the network is completed, only the rounded displacement parameters are retained.

Optionally, S102 may further comprise:
rounding off the floating-point displacement amounts in the preset displacement parameter to obtain integer displacement amounts; and
displacing respectively, according to the integer displacement amounts in the preset displacement parameter, each of channels of the input feature map along the axes, to obtain the displaced feature map.

When the forward derivation or training is completed, each displacement operation shall be based on the integer displacement amount. Therefore, it is necessary to round floating-point displacement amounts in the preset displacement parameter and perform displacement based on the integer displacement amount to obtain a displacement feature map.

S103, performing convolution operation on the displaced feature map with a 1×1 convolution kernel to obtain an output feature map of the network layer.

After obtaining the displaced feature map, the convolution operation is performed on the displaced feature map with the 1×1 convolution kernel. Since the displaced feature map can communicate information in the receptive field, the 1×1 convolution kernel may not only aggregate information on a channel dimension, but also aggregate information aggregation.

Figure 3A:
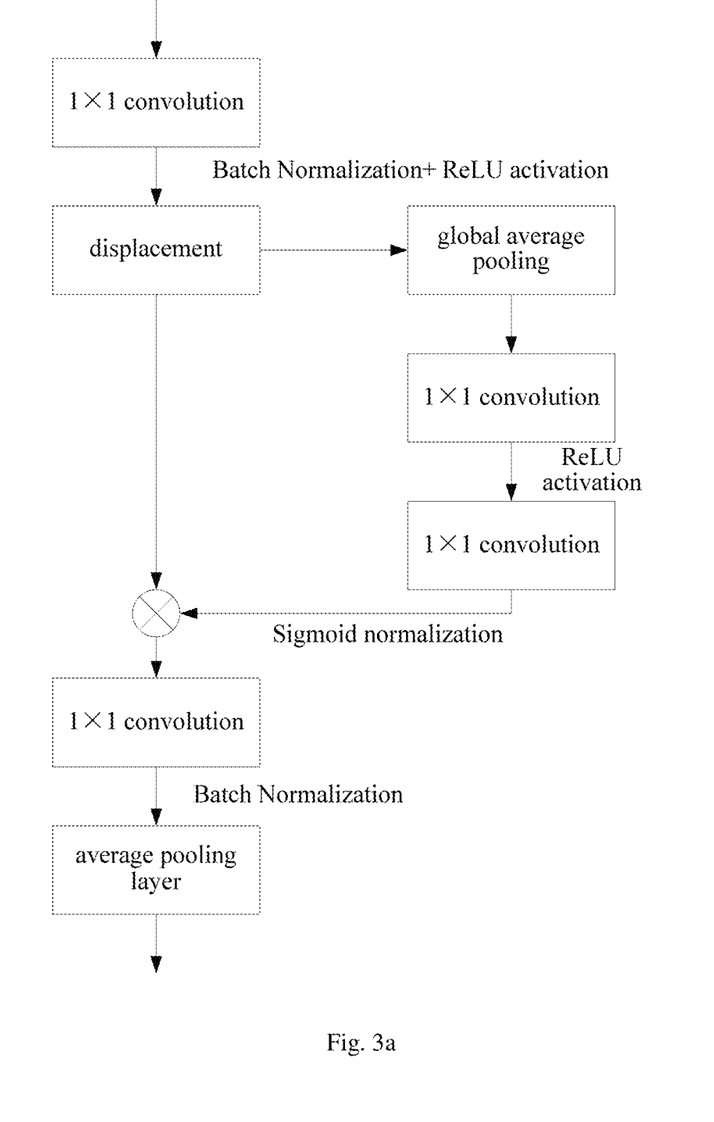
FIG. 3a is a schematic diagram of a deep neural network structure according to one embodiment of the present application.
Figure 3B:
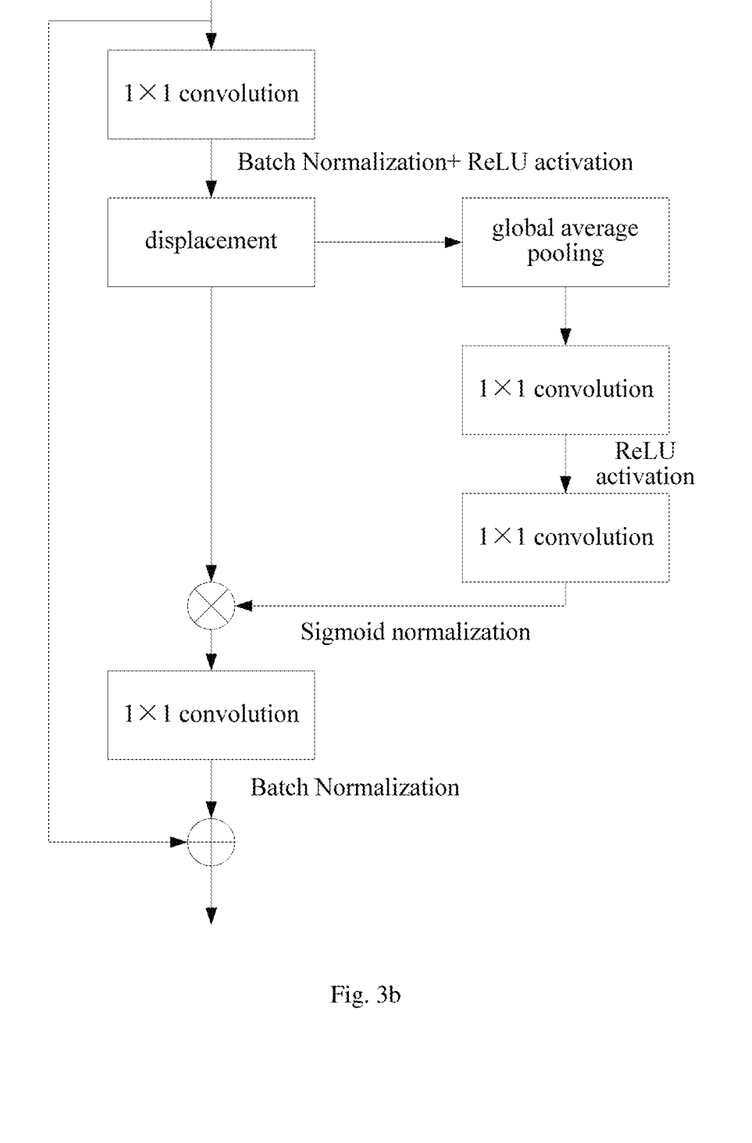
FIG. 3b is a schematic diagram of a deep neural network structure according to another embodiment of the present application.

FIG. 3a and FIG. 3b are network structures of the deep neural network in the embodiment. FIG. 3a is a network structure with a stride of 2, and FIG. 3b is the network structure with a stride of 1. Both network structures do not contain any convolution layer with convolution core greater than 1. The right branches of FIG. 3a and FIG. 3b relate to a channel attention mechanism, the focus of which on some useful information in the channel. This is not the focus of the embodiment and will not be described in detail here. In addition to the network structure shown in FIGS. 3a and 3b, the network structure of the deep neural network may have other variants, further examples of which are not provided here.

In embodiments of the present application, a solution is provided as follows. An input feature map of a network layer is obtained. Each of channels of the input feature map of the network layer is displaced respectively, along each of axes, according to a preset displacement parameter. In this way, a displacement feature map is obtained. Convolution operation is performed on the displacement feature map with a 1×1 convolution kernel to obtain an output feature map of the network layer. Each of channels of the input feature map of the network layer is displaced along axes respectively. A misplacement of the input feature map of the network layer is used, to communicate information in the receptive field. As such, the subsequent 1×1 convolution kernel may not only aggregate information on a channel dimension, but also aggregate information on a spatial domain dimension. The whole process requires only a single 1×1 convolution. This effectively improves the operation efficiency of the DNN. Through the combination of the displacement structure and 1×1 convolution core, a lightweight network structure that meets the accuracy of lightweight network can be constructed, while avoiding the use of DWConv. The network structure according to this embodiment may run efficiently on graphics processing unit (GPU) platform or other hardware platforms, and has an important industrial and engineering value. By applying the network structure according to the embodiment on a GPU platform or other hardware platforms, the execution efficiency of the hardware platform for object detection and segmentation, behavior detection and recognition, and speech recognition can be improved, such that performance of the hardware platform can be improved.

Figure 4:
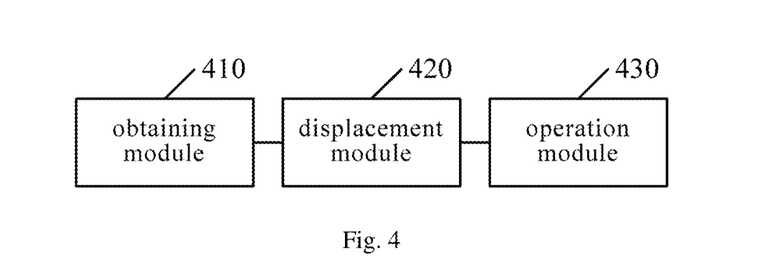
FIG. 4 is a schematic structural diagram of a depth neural network operation apparatus according to an embodiment of the present application.

Corresponding to the above method embodiment, an embodiment of the present application provides a deep neural network operation apparatus. As shown in FIG. 4, the deep neural network operation apparatus may include:

an obtaining module 410, configured for obtaining an input feature map of a network layer;

a displacement module 420, configured for displacing respectively, according to a preset displacement parameter, each of channels of the input feature map of the network layer along axes, to obtain a displaced feature map, wherein the preset displacement parameter comprises displacement amounts of the channel in the axes; and an operation module 430, configured for performing convolution operation on the displaced feature map with a 1×1 convolution kernel to obtain an output feature map of the network layer.

Optionally, a displacement amount is an average distribution of multiple preset different offsets.

Optionally, the preset displacement parameter is obtained by learning in advance.

The apparatus may further include: a learning module configured for:

obtaining an initial displacement parameter;

converting the displacement amounts in the initial displacement parameter into floating-point displacement amounts;

obtaining an output function of the network layer through a bilinear interpolation algorithm according to the input feature map of the network layer and the floating-point displacement amounts;

determining a network loss value of the depth neural network according to input data of the depth neural network, the 1×1 convolution kernel, the displacement parameter and a label corresponding to the input data; and calculating, according to the output function of the network layer, a gradient of the network loss value with respect to the displacement parameter, and updating the displacement parameter in multiple iterations by a gradient descent method to obtain the preset displacement parameter.

Optionally, the learning module is specifically configured for:

calculating a network loss function of the deep neural network according to the input data of the deep neural network, the 1×1 convolution kernel, the initial displacement parameter, and the label corresponding to the input data;

calculating a first regularization term according to the 1×1 convolution kernel;

calculating a second regularization term according to the displacement parameters; and weighting the network loss function, the first regularization term, and the second regularization term to obtain the network loss value of the deep neural network.

Optionally, the displacement module 420 is specifically configured for:

rounding off the floating-point displacement amounts in the preset displacement parameter to obtain an integer displacement amounts; and displacing respectively, according to the integer displacement amounts in the preset displacement parameter, each of channels of the input feature map along the axes, to obtain the displaced feature map.

In embodiments of the present application, a solution is provided as follows. An input feature map of a network layer is obtained. Each of channels of the input feature map of the network layer is displaced respectively, along each of axes, according to a preset displacement parameter. In this way, a displacement feature map is obtained. Convolution operation is performed on the displacement feature map with a 1×1 convolution kernel to obtain an output feature map of the network layer. Each of channels of the input feature map of the network layer is displaced along axes respectively. A misplacement of the input feature map of the network layer is used, to communicate information in the receptive field. As such, the subsequent 1×1 convolution kernel may not only aggregate information on a channel dimension, but also aggregate information on a spatial domain dimension. The whole process requires only a single 1×1 convolution. This effectively improves the operation efficiency of the DNN.

Figure 5:
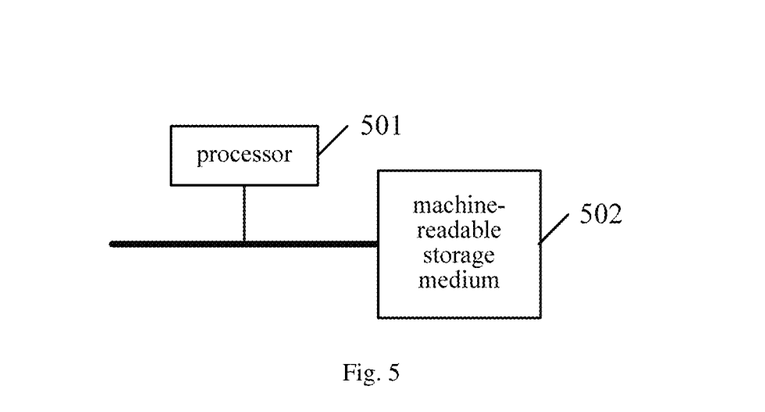
FIG. 5 is a schematic structural diagram of an electronic device according to an embodiment of the present application.

In order to improve the operation efficiency of the DNN, an embodiment of the present application further provides an electronic device including, as shown in FIG. 5 a processor 501 and a machine-readable storage medium 502.

The machine-readable storage medium 502 is configured to store machine executable instructions that can be executed by the processor 501.

The processor 501 is configured to perform the method according to the embodiment of the present application when executing the machine executable instructions stored on the machine-readable storage medium 502.

The data transmission between the machine-readable storage medium 502 and the processor 501 may be conducted by wired connection or wireless connection, and the electronic device may communicate with other devices through wired communication interface or wireless communication interface.

The above machine-readable storage medium may include a Random Access Memory (RAM), and may also include a Non-volatile memory (NVM), such as at least one disk memory. Optionally, the machine-readable storage medium may also be at least one storage device located away from the processor.

The above processor may be a general purpose processor, which includes a Central Processing Unit (CPU), or a Network Processor (NP). It may also be a Digital Signal Processor (DSP), an Application Specific Integrated Circuit (ASIC), a Field-Programmable Gate Array (FPGA) or other programmable logic devices, discrete gates or transistor logic devices, discrete hardware components.

In embodiments of the present application, a processor of an electronic device can read and execute machine-executable instructions stored in a machine readable storage medium so as to implement the following operations. An input feature map of a network layer is obtained. Each of channels of the input feature map of the network layer is displaced respectively, along each of axes, according to a preset displacement parameter. In this way, a displacement feature map is obtained. Convolution operation is performed on the displacement feature map with a 1×1 convolution kernel to obtain an output feature map of the network layer. Each of channels of the input feature map of the network layer is displaced along axes respectively. A misplacement of the input feature map of the network layer is used, to communicate information in the receptive field. As such, the subsequent 1×1 convolution kernel may not only aggregate information on a channel dimension, but also aggregate information on a spatial domain dimension. The whole process requires only a single 1×1 convolution. This effectively improves the operation efficiency of the DNN.

In addition, in correspondence with the deep neural network operation method according to above embodiments, embodiments further provide a machine-readable storage medium having machine executable instructions stored thereon which, when executed by a processor, cause the processor to perform the deep neural network operation method described above.

In embodiments of the present application, machine-executable instructions stored in a machine readable storage medium can be executed so as to perform the following operations. An input feature map of a network layer is obtained. Each of channels of the input feature map of the network layer is displaced respectively, along each of axes, according to a preset displacement parameter. In this way, a displacement feature map is obtained. Convolution operation is performed on the displacement feature map with a 1×1 convolution kernel to obtain an output feature map of the network layer. Each of channels of the input feature map of the network layer is displaced along axes respectively. A misplacement of the input feature map of the network layer is used, to communicate information in the receptive field. As such, the subsequent 1×1 convolution kernel may not only aggregate information on a channel dimension, but also aggregate information on a spatial domain dimension. The whole process requires only a single 1×1 convolution. This effectively improves the operation efficiency of the DNN.

In addition, embodiments of the present application further provide an application program which, when executed, performing the deep neural network operation method according to the embodiments of the present application.

In embodiments of the present application, an application program can be executed to perform the following operations. An input feature map of a network layer is obtained. Each of channels of the input feature map of the network layer is displaced respectively, along each of axes, according to a preset displacement parameter. In this way, a displacement feature map is obtained. Convolution operation is performed on the displacement feature map with a 1×1 convolution kernel to obtain an output feature map of the network layer. Each of channels of the input feature map of the network layer is displaced along axes respectively. A misplacement of the input feature map of the network layer is used, to communicate information in the receptive field. As such, the subsequent 1×1 convolution kernel may not only aggregate information on a channel dimension, but also aggregate information on a spatial domain dimension. The whole process requires only a single 1×1 convolution. This effectively improves the operation efficiency of the DNN.

The embodiments of the electronic device, machine-readable storage media and application program are described briefly since they are substantially similar to the above method embodiment, and details of related parts can be known with reference to the description of the method embodiment.

It should be noted that the relationship terms used herein such as "first", "second", and the like are only used for distinguishing one entity or operation from another entity or operation, but do not necessarily require or imply that there is any actual relationship or order between these entities or operations. Moreover, the terms "comprise", "comprise" or any other variants thereof are intended to cover non-exclusive inclusions, so that processes, methods, articles or devices comprising a series of elements comprise not only those elements listed but also those not specifically listed or the elements intrinsic to these processes, methods, articles, or devices. Without further limitations, elements defined by the sentences "comprise(s) a . . . " or "comprise(s) a . . . " do not exclude that there are other identical elements in the processes, methods, articles, or devices which comprise these elements.

All the embodiments are described in corresponding ways, same or similar parts in each of the embodiments can be referred to one another, and the parts emphasized are differences to other embodiments. In particular, the embodiment of the system is described briefly since it is substantially similar to the method embodiment, and the related parts can be referred to the corresponding description of the method embodiment.

The embodiments described above are simply preferable embodiments of the present application, and are not intended to limit the present application. Any modifications, alternatives, improvements, or the like within the spirit and principle of the present application shall be comprised within the scope of protection of the present application.

What is claimed is:

1. A deep neural network operation method which is applied in target detection and segmentation, behavior detection and recognition or speech recognition, and executed by an electronic device comprising a processor and a machine-readable storage medium having machine-executable instructions stored thereon which can be executed by the processor, wherein the processor is configured to perform, when executing the machine executable instructions, operations of:

obtaining an input feature map of a network layer;

displacing respectively, according to a preset displacement parameter, each of channels of the input feature map of the network layer along axes, to obtain a displaced feature map, wherein the preset displacement parameter comprises displacement amounts of the channel in the axes, and the preset displacement parameter is obtained by learning in advance; and performing convolution operation on the displaced feature map with a 1×1 convolution kernel to obtain an output feature map of the network layer, wherein the process of obtaining the preset displacement parameter by learning comprises:

obtaining an initial displacement parameter;

converting the displacement amounts in the initial displacement parameter into floating-point displacement amounts;

obtaining an output function of the network layer through a bilinear interpolation algorithm according to the input feature map of the network layer and the floating-point displacement amounts;

determining a network loss value of the depth neural network according to input data of the depth neural network, the 1×1 convolution kernel, the initial displacement parameter and a label corresponding to the input data; and calculating, according to the output function of the network layer, a gradient of the network loss value with respect to the displacement parameter, and updating the displacement parameter in multiple iterations by a gradient descent method to obtain the preset displacement parameter.

2. The method according to claim 1, wherein, a displacement amount is an average distribution of multiple preset different offsets.

3. The method according to claim 1, determining a network loss value of the depth neural network according to input data of the depth neural network, the 1×1 convolution kernel, the initial displacement parameter and a label corresponding to the input data comprises:

calculating a network loss function of the deep neural network according to the input data of the deep neural network, the 1×1 convolution kernel, the initial displacement parameter, and the label corresponding to the input data;

calculating a first regularization term according to the 1×1 convolution kernel;

calculating a second regularization term according to the displacement parameter; and weighting the network loss function, the first regularization term, and the second regularization term to obtain the network loss value of the deep neural network.

4. The method according to claim 1, wherein, displacing respectively, according to a preset displacement parameter, each of channels of the input feature map of the network layer along axes, to obtain a displaced feature map comprises:

rounding off the floating-point displacement amounts in the preset displacement parameter to obtain integer displacement amounts; and displacing respectively, according to the integer displacement amounts in the preset displacement parameter, each of channels of the input feature map along the axes, to obtain the displaced feature map.

5. A deep neural network operation apparatus applied in target detection and segmentation, behavior detection and recognition or speech recognition, the apparatus comprising:

a memory that stores executable modules; and a processor coupled to the memory, that executes and facilitates execution of the executable modules, the processor comprising:

an obtaining module, configured for obtaining an input feature map of a network layer;

a displacement module, configured for displacing respectively, according to a preset displacement parameter, each of channels of the input feature map of the network layer along axes, to obtain a displaced feature map, wherein the preset displacement parameter comprises displacement amounts of the channel in the axes, and the preset displacement parameter is obtained by learning in advance; and an operation module, configured for performing convolution operation on the displaced feature map with a 1×1 convolution kernel to obtain an output feature map of the network layer, wherein the executable modules further comprise: a learning module configured for:

obtaining an initial displacement parameter;

converting the displacement amounts in the initial displacement parameter into floating-point displacement amounts;

obtaining an output function of the network layer through a bilinear interpolation algorithm according to the input feature map of the network layer and the floating-point displacement amounts;

determining a network loss value of the depth neural network according to input data of the depth neural network, the 1×1 convolution kernel, the displacement parameter and a label corresponding to the input data; and calculating, according to the output function of the network layer, a gradient of the network loss value with respect to the displacement parameter, and updating the displacement parameter in multiple iterations by a gradient descent method to obtain the preset displacement parameter.

6. The apparatus according to claim 5, wherein, a displacement amount is an average distribution of multiple preset different offsets.

7. The apparatus according to claim 5, wherein the learning module is further configured for:

calculating a network loss function of the deep neural network according to the input data of the deep neural network, the 1×1 convolution kernel, the initial displacement parameter, and the label corresponding to the input data;

calculating a first regularization term according to the 1×1 convolution kernel;

calculating a second regularization term according to the displacement parameters; and weighting the network loss function, the first regularization term, and the second regularization term to obtain the network loss value of the deep neural network.

8. The apparatus according to claim 5, wherein the displacement module is further configured for:

rounding off the floating-point displacement amounts in the preset displacement parameter to obtain an integer displacement amounts; and displacing respectively, according to the integer displacement amounts in the preset displacement parameter, each of channels of the input feature map along the axes, to obtain the displaced feature map.

9. An electronic device, comprising a processor, and a machine-readable storage medium having machine executable instructions stored thereon which, when executed by the processor, cause the processor to perform the method of claim 1.

10. A non-transitory machine-readable storage medium having machine-executable instructions stored thereon which, when called and executed by a processor, cause the processor to perform the method of claim 1.

* * * * *